United States Patent
Haussler et al.

(10) Patent No.: US 8,339,695 B2
(45) Date of Patent: Dec. 25, 2012

(54) CONTROLLABLE ILLUMINATION DEVICE

(75) Inventors: Ralf Haussler, Dresden (DE); Armin Schwerdtner, Dresden (DE)

(73) Assignee: Seereal Technologies GmbH, Dresden (DE)

( * ) Notice: Subject to any disclaimer, the term of this patent is extended or adjusted under 35 U.S.C. 154(b) by 710 days.

(21) Appl. No.: 11/912,328

(22) PCT Filed: Apr. 25, 2006

(86) PCT No.: PCT/DE2006/000709
§ 371 (c)(1),
(2), (4) Date: Oct. 23, 2007

(87) PCT Pub. No.: WO2006/116965
PCT Pub. Date: Nov. 9, 2006

(65) Prior Publication Data
US 2008/0212153 A1 Sep. 4, 2008

(30) Foreign Application Priority Data
Apr. 29, 2005 (DE) .......................... 10 2005 021 155

(51) Int. Cl.
*G03H 1/02* (2006.01)
(52) U.S. Cl. .............................. 359/28; 359/15; 345/418
(58) Field of Classification Search ............... 359/1–35; 345/7, 8, 9, 418–427; 351/205–221
See application file for complete search history.

(56) References Cited

U.S. PATENT DOCUMENTS

| | | | |
|---|---|---|---|
| 5,539,543 A | 7/1996 | Liu | |
| 7,338,168 B2 * | 3/2008 | Cartlidge et al. | 351/206 |
| 7,535,607 B2 * | 5/2009 | Schwerdtner et al. | 359/9 |
| 7,660,039 B2 * | 2/2010 | Santoro et al. | 359/599 |
| 2004/0233275 A1 | 11/2004 | Tomita | |
| 2006/0139711 A1 * | 6/2006 | Leister et al. | 359/9 |
| 2007/0081207 A1 * | 4/2007 | Bimber | 359/9 |
| 2010/0027083 A1 * | 2/2010 | Kroll et al. | 359/9 |
| 2010/0033784 A1 * | 2/2010 | Renaud-Goud | 359/29 |

FOREIGN PATENT DOCUMENTS

| | | |
|---|---|---|
| DE | 10353439 A1 | 6/2004 |
| DE | 10339076 A1 | 3/2005 |
| GB | 2404991 A | 2/2005 |
| WO | WO00/43841 A1 | 7/2000 |
| WO | WO02/12930 A1 | 2/2002 |
| WO | WO03/053072 A1 | 6/2003 |

* cited by examiner

*Primary Examiner* — Jennifer L. Doak
(74) *Attorney, Agent, or Firm* — Saul Ewing LLP

(57) ABSTRACT

The invention relates to a controllable illumination device for an autostereoscopic or holographic display, which illumination device contains an illumination matrix of primary light sources having at least one luminous element per light source and a controllable light modulator (SLM) and a reproduction matrix. A computer-generated hologram (CGH) illuminated by the primary light sources ($11, \ldots, 1n$) is coded on the controllable light modulator (SLM) and generates, in at least one plane downstream of the SLM, a matrix—reconstructed from the computer-generated hologram (CGH)—of secondary light sources (2) having a secondary light distribution for the purpose of illuminating the reproduction matrix (4) and for the purpose of focussing in light bundles onto each eye of the viewer via an imaging matrix. The CGH is calculated and reconstructed on the basis of the number of and the positions of the viewers and the system parameters. Owing to the reconstruction of the secondary light sources in a plurality of planes, it is possible for the image information of the display to be tracked for the viewers not only in the case of lateral movements but also in the axial direction.

11 Claims, 5 Drawing Sheets

CONTROLLABLE ILLUMINATION DEVICE

CROSS REFERENCE TO RELATED APPLICATIONS

This application claims the priority of PCT/DE2006/000709 filed on Apr. 25, 2006 and DE 10 2005 021 155.0 filed on Apr. 29, 2005, the entire contents of which are hereby incorporated in total by reference.

BACKGROUND OF THE INVENTION

This invention relates to a controllable illumination device which consists of an illumination matrix with a backlight of primary light sources and a controllable light modulator, whereby an imaging matrix projects the light of said light modulator in bundles through a reproduction matrix, which it permeates full with light, on to at least one viewer. The reproduction matrix can be a stereoscopic or holographic display which contains monoscopic or stereoscopic information. The primary light sources may be point shaped light sources, line shaped light sources or area shaped light sources with at least one light-emitting element per light source.

Displays for 2D representations typically comprise a so-called backlight which illuminates the reproduction matrix. The backlight must have a homogeneously bright surface area which is at least as large as that of the reproduction matrix in order to achieve uniform image brightness. In contrast, with autostereoscopic 3D displays (ASD) for stereoscopic viewing the reproduction matrix must also be illuminated homogeneously, but not the viewing space. Here, different perspective views of the reconstructed object are projected separately into neighbouring regions of the viewing space such that the left and right eyes of the viewer see different views of the object, the viewer thus perceiving a three-dimensional reconstruction. An imaging matrix with periodically arranged cylindrical lenses is therefore often illuminated through line light sources in order to achieve this directed irradiation.

If one or several viewers move, their position changes are preferably detected and the corresponding views are tracked accordingly so that the stereo impression is maintained for that viewer/those viewers. For this, the distance and/or position of the light sources may be variable. A variable arrangement of line shaped light sources in order to be able track a visibility region is also required if instead of the autostereoscopic display a holographic display is used as reproduction matrix. This applies in particular if a holographic display with tracked viewing windows is used as disclosed by the applicant in DE 103 53 439.

The large-area backlight, which is typically used in directed illumination devices, is usually combined for intensity control with a LCD panel, which acts as a shutter, as described by the applicant in OS 103 39 076 A1. This shutter consists of a regular arrangement of controllable transparent and absorbing areas, which only let the light emitted by the large-area backlight pass at the desired positions. The transparent areas are displaced in a suitable manner in order to be able to track the perspective views as described above. For this, the transparent rows or columns on the shutter are controlled accordingly. The largest portion of the light is absorbed by the less or not transparent areas of the shutter. Very powerful backlights are required to achieve sufficient image brightness despite this absorption of large portions of light. Such powerful backlights are expensive as regards both purchase costs and energy consumption. Moreover, the absorbed light considerably heats up the display. Further, the diffused light of a shutter leads to a reduced stereo contrast.

Another device for focussing light on to viewers' eyes in space is disclosed in WO 03/053072. It employs a backlight which can be positioned three-dimensionally. Several configurations are described. The light sources which can be activated in the 3D backlight are projected on to viewers' eyes by an imaging system and tracked according to the viewers' motion. Thereby, on its way to the viewer the light permeates a reproduction matrix, which alternately provides images for the left and right eye of the viewer(s). The disadvantage of this method is the great depth of the autostereoscopic display caused by the three-dimensional backlight and an imaging lens which has an extremely large diameter. In order to confine aberrations of such large lenses outside the optical axis, a sufficiently large focal length must be chosen, which makes the appliance very deep. Moreover, the device is very heavy and a backlight which can be positioned three-dimensionally is difficult to manufacture.

Further, monoscopic and autostereoscopic display illumination systems which use holograms to generate directed light instead of controllable shutter masks are known. WO 02/12930 A1 describes an illumination system which consists of a collimated backlight and two holograms disposed one behind the other. This spatially interleaved double hologram generates a left and a right visibility region for one viewer. The pitch of the interleaved holograms is defined by the pitch of the information display and fixed in the recording process. However, this illumination system is thus not controllable as would be required for tracking the visibility regions, for example if the viewer moves sideways. A re-encoding of the holograms, as would be necessary to be able to track the visibility regions, does not take place.

The illumination system described in WO 00/43841 consists of a light source and a multitude of holograms disposed one behind another. These holograms are controllable in so far as they can be switched between an active condition, where the impinging light is diffracted, to a passive condition without any diffraction effects. The generation of a variable light source pattern by way of re-encoding the holograms is not subject of that invention.

Further, GB 2 404 991 A describes the use of a controllable holographic optical element (HOE) in conjunction with a reflective illumination arrangement. The optical path of an information display is thereby divided into two separate visibility regions. In this way, together with the non-directed backlight for transmissive illumination of the information display, switching between a 2D mode and a 3D mode becomes possible.

Further, above-mentioned devices and methods which employ holograms do not affect the primary illumination system, but always modify the entire light emitted by the backlight. The drawbacks of great power consumption and heating-up are thus not eliminated.

SUMMARY OF THE INVENTION

It is an object of this invention to provide a controllable illumination device for the generation of structured illumination means in a 3D display which do not emit light from their entire surface areas, said illumination device being used for homogeneously illuminating a reproduction matrix at a great stereo contrast of the 3D presentation. At the same time, the controllable illumination device is also intended to provide for a correction of optical aberrations of the imaging matrix used and for convenient multi-user operation.

This object is solved in an inventive manner through an illumination device which contains a matrix of primary light sources and a controllable light modulator, and which directs the light through a reproduction matrix alternately on to the viewers' right and left eyes in a viewing plane. In the context of this invention, the term "controllable light modulator" shall denote a light modulator which modulates the phase and/or amplitude of light depending on the coordinates in a two-dimensional matrix.

According to a first feature of this invention, the matrix of primary light sources creates a structured illumination matrix by encoding a computer-generated hologram (CGH) on the controllable light modulator, whereby the encoding is performed using variable parameters in order to realise an illumination configurable depending on the position of the viewer's eyes. The matrix of primary light sources illuminates said CGH. According to a second feature of this invention, the CGH reconstructs in at least one subsequent plane a matrix of secondary light sources with a secondary light distribution for illuminating the reproduction matrix and to focus in bundles of rays on to the respective eye of a viewer.

This makes it possible to transform a primary light distribution of the primary light sources into a required secondary light distribution of secondary light sources which depends on the position of the viewer(s). The primary light sources may be point shaped light sources, line shaped light sources or area shaped light sources. The reconstructed secondary light sources form a matrix which optionally comprises point light elements, line light elements or area light elements with a secondary light distribution.

Visibility regions can be switched on or off, displaced or tracked preferably by several measures, e.g. in order to follow a moving viewer or to supply several viewers with light. Either, the location or intensity of the entire matrix of primary light sources or of selected light sources of this matrix can be changed while a certain hologram encoding is maintained, or the encoded CGH can be modified while keeping the primary light sources unchanged. It is further possible to combine these two measures. Thanks to these measures, the secondary light sources are preferably reconstructed in several planes at the same time, so that they form a so-called three-dimensional backlight. In this way, a multitude of viewers can be provided with bundles of rays and thus a 3D scene simultaneously. Alternatively, one viewer is provided the desired information in the 3D mode and another viewer is provided a monoscopic view. The secondary light distribution can be modified by the arrangement, number and intensity of the secondary light sources of the matrix.

Optical aberrations such as field curvature of the imaging elements of the imaging matrix can be avoided preferably by compensating such aberrations when encoding the CGH. The SLM used for encoding is a diffractive optical element (DOE) which can be transmissive or reflective and which is able to modulate the phase and/or amplitude of light. It may further be a phase-mostly or amplitude-mostly CGH. In individual embodiments, optical elements used for shaping, deflecting or blanking bundles of rays may be disposed in front of or behind the light modulator. In a further embodiment, the controllable light modulator can be followed by another transmissive controllable light modulator to absorb diffused light and light of higher diffraction orders, and for limiting the extension of the secondary light sources.

The imaging matrix of the display actually used may be a lenticular with lenticules arranged in parallel, a lens array or a holographic optical element (HOE). The elements of the imaging matrix may be adjustable. If a holographically encoded reproduction matrix is used for rendering information in a holographic display, attention must be paid to ensuring sufficient spatial and temporal coherence of the primary and secondary light sources in order to be able to reconstruct the hologram. Other preferred embodiments are described in dependent claims.

The arrangement of said means as set forth in this description provides configurable controllable light sources to be used as illumination means in autostereoscopic and holographic displays which realise an efficient usage of light. To avoid widely absorbing elements in creating secondary light sources results in minimal loss of light energy used. This makes it practically possible to use low-intensity primary light sources as backlight, which leads to lower power consumption and heat generation. Compared with prior art devices, the quantity of light is lower, so that less light is diffused and the stereo contrast is improved because cross talk to the other eye is minimised. The illumination device according to this invention thus avoids the disadvantages exhibited by conventional backlights and integrates additional options for correcting optical aberrations produced by the imaging matrix.

The possibility to continuously vary the three-dimensional positions of the secondary light sources through their reconstruction in several planes without changing the distance between the primary light sources and the reproduction matrix is a major technological and economic improvement compared with a three-dimensional arrangement of primary light sources in prior art devices. This possibility is particularly advantageous in conjunction with multi-user displays.

These and other features of the invention will be more fully understood by reference to the following drawings.

DETAILED DESCRIPTION OF THE INVENTION

Now, the controllable illumination device according to this invention will be described with the help of an autostereoscopic display with a lenticular as imaging matrix, where the image information is sequentially provided by the reproduction matrix. If the autostereoscopic display is a multi-user display and if the illumination matrix contains for example line shaped light sources which illuminate the reproduction matrix and which direct bundles of rays on to viewers' eyes, further line shaped light sources will be required for further viewers' eyes in addition to the line shaped light sources for the left and right eye of the first viewer. Such type of illumination is realised with the help of the solution according to this invention.

Figure 1:
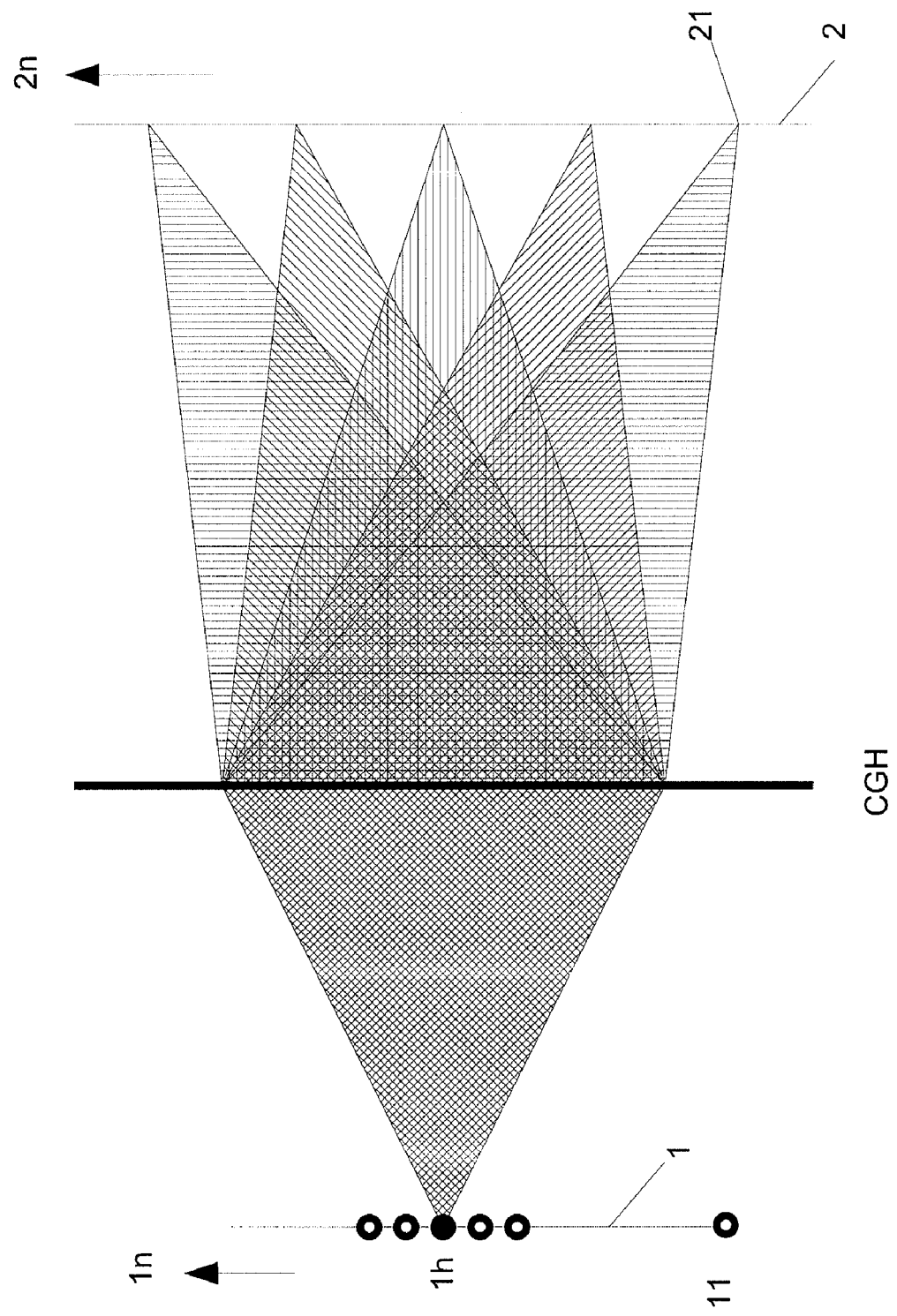
FIG. 1 shows an illumination device with primary light sources and a hologram which is illuminated by an activated light source and which reconstructs secondary light sources in a plane.

FIG. 1 shows schematically a detail of the controllable illumination device according to this invention. Specifically, it shows a part of the matrix of primary light sources 1, a part of the light modulator (SLM) in which a partial hologram (CGH) is encoded, and a part of a matrix of secondary light sources 2. In the matrix of primary light sources 1, which includes the light sources 11, . . . , 1n, a light source 1h is activated and illuminates the partial hologram. The partial hologram reconstructs a matrix of secondary light sources 2, which includes the light sources 21, . . . , 2n, all of them being equidistantly arranged in one plane in the example shown.

Instead of one primary light source, a multitude of primary light sources with different intensities may be activated. The partial holograms may be illuminated simultaneously by a multitude of primary light sources.

Figure 2:
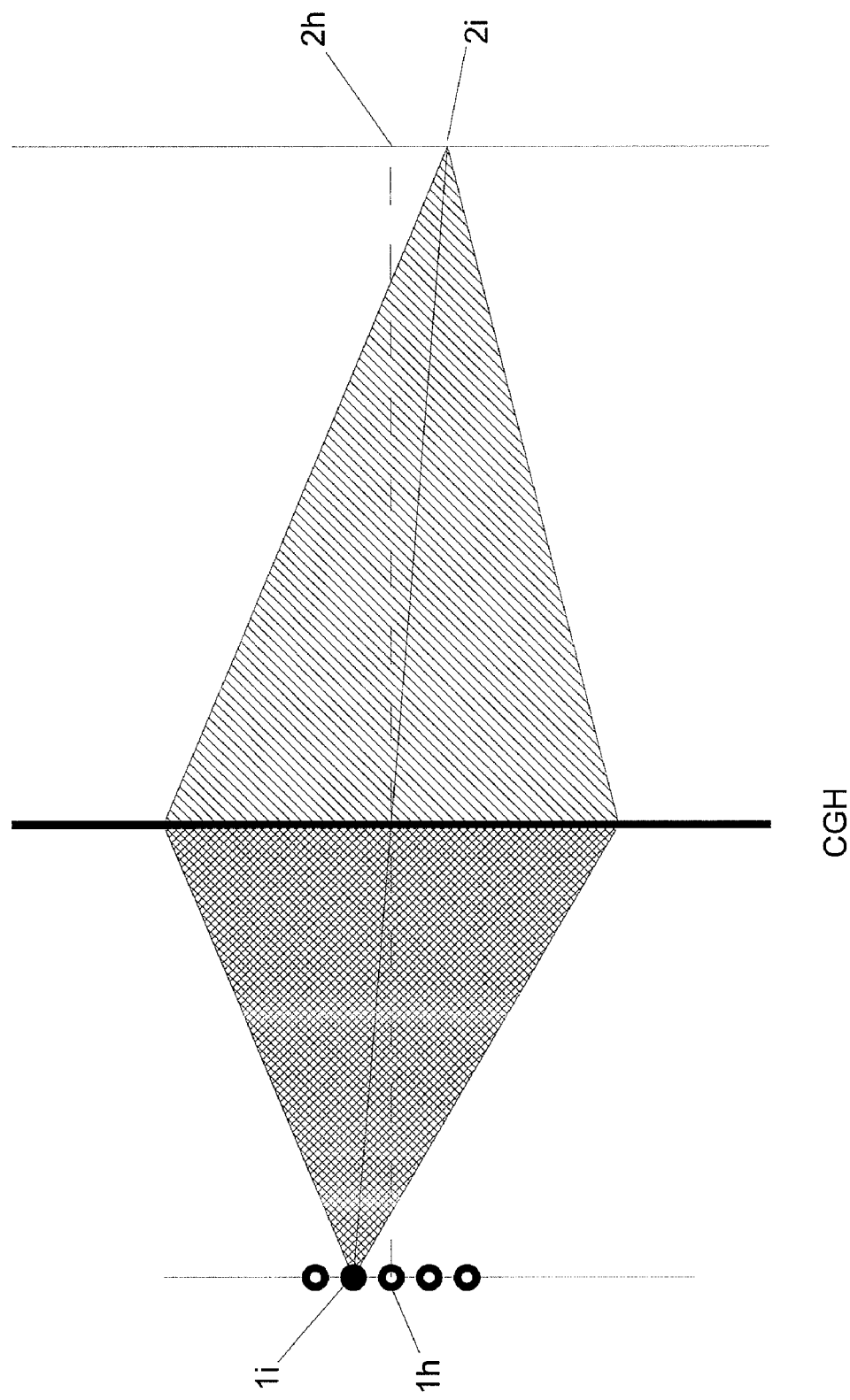
FIG. 2 shows a primary light source and the corresponding secondary light source to illustrate how the matrix of secondary light sources can be modified by displacing primary light sources.

With the help of a selected primary light source 1h and a partial hologram, FIG. 2 shows how the secondary light source 2h can be displaced by displacing the primary light source 1h, e.g. in order to track a viewer moving sideways. For the sake of simplicity, only one primary light source 1h and one secondary light source 2h, as well as the displaced primary light source 1i and the resulting reconstructed secondary light source 2i are shown in the Figure.

Figure 3:
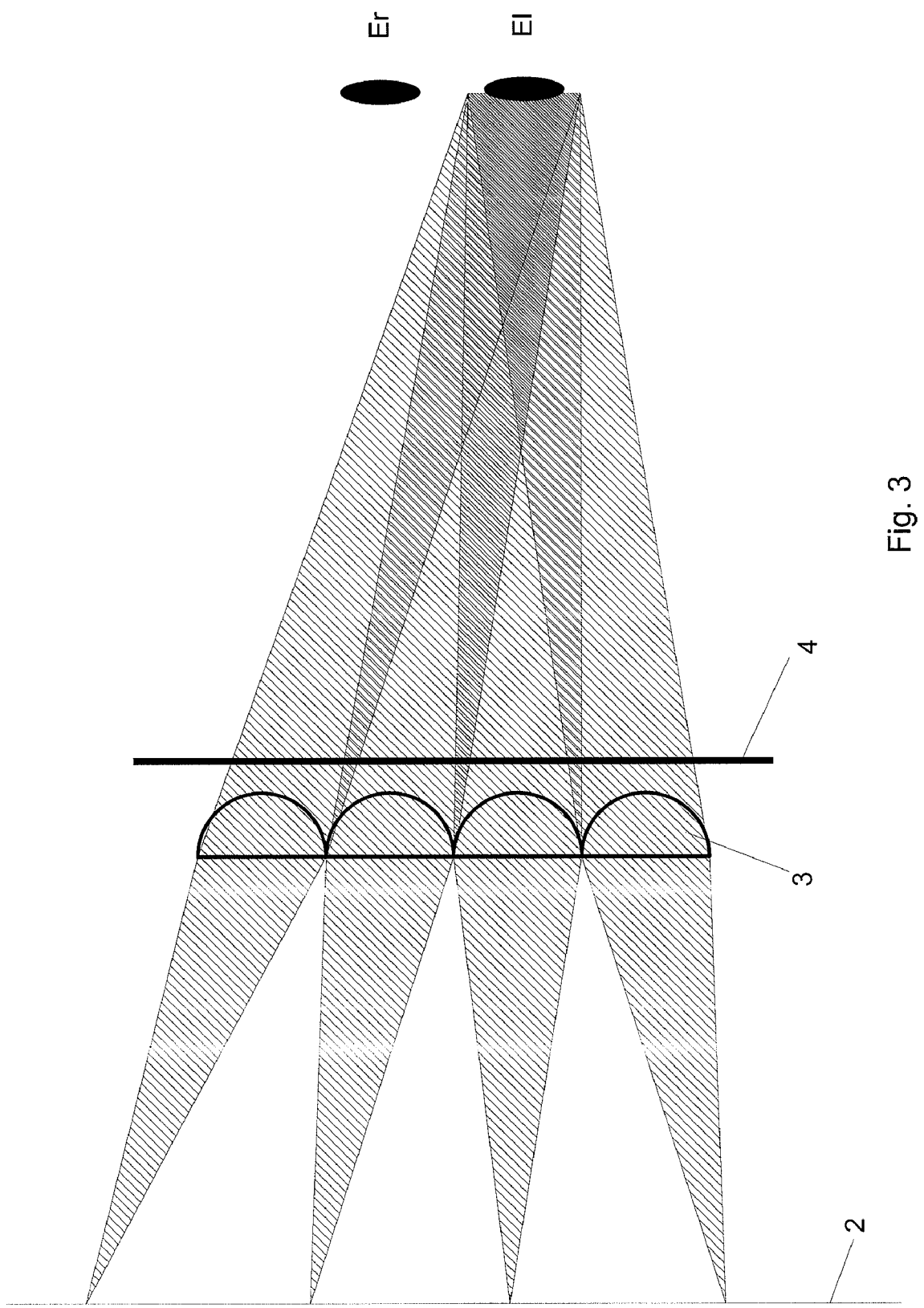
FIG. 3 shows bundles of light, which are emitted by secondary light sources, which are projected through a lenticular forming the imaging matrix, and which illuminate a reproduction matrix of an autostereoscopic display and a left viewer's eye.

FIG. 3 shows bundles of rays which are emitted by the matrix of secondary light sources 2 and which run through a lenticular 3, which represents the imaging matrix. The imaging matrix projects the bundles of rays through a reproduction matrix 4 of an autostereoscopic display on to a left eye El of a viewer. The positions and distances of the reconstructed secondary light sources 21, . . . , 2n (see FIG. 1) in relation to the lenticules of the lenticular are selected such that the light bundles emitted by these lenticules meet on the left eye El of the viewer. By generating the secondary light sources 21, . . . , 2n at different positions, the other eye can be illuminated sequentially. As further light sources are activated, the other eye El can be provided with different image information at the same time.

Figure 4:
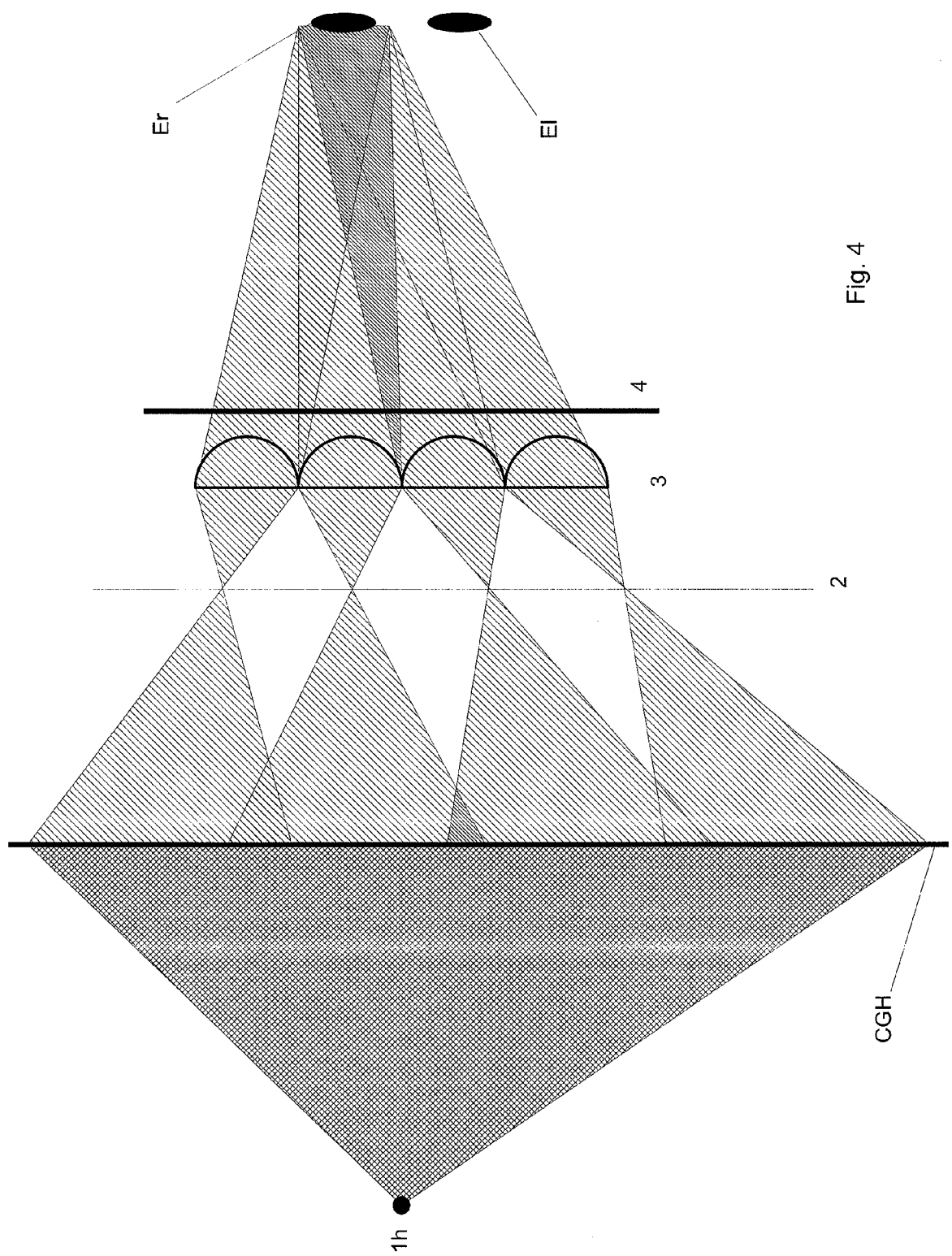
FIG. 4 shows schematically the general design of an autostereoscopic multi-user display which contains the illumination device according to this invention. The Figure also shows the optical path in the display for the right eye of a viewer.

FIG. 4 shows schematically a detail of an autostereoscopic multi-user display which comprises the controllable illumination device according to this invention. It also shows the optical path in the display for a right eye Er of a viewer, which is provided with image information in the reproduction matrix 4. Additional optical elements for shaping, deflection or partial absorption of bundles of rays or of diffused light may be disposed in various planes in front of and behind the CGH. Such additional optical elements are not shown for the sake of simplicity. The method exemplified in FIG. 2 can also be used to alternatively illuminate the left eye El, e.g. by displacing the secondary light sources of the matrix 2, so that the left eye can receive information simultaneously or sequentially.

Figure 5:
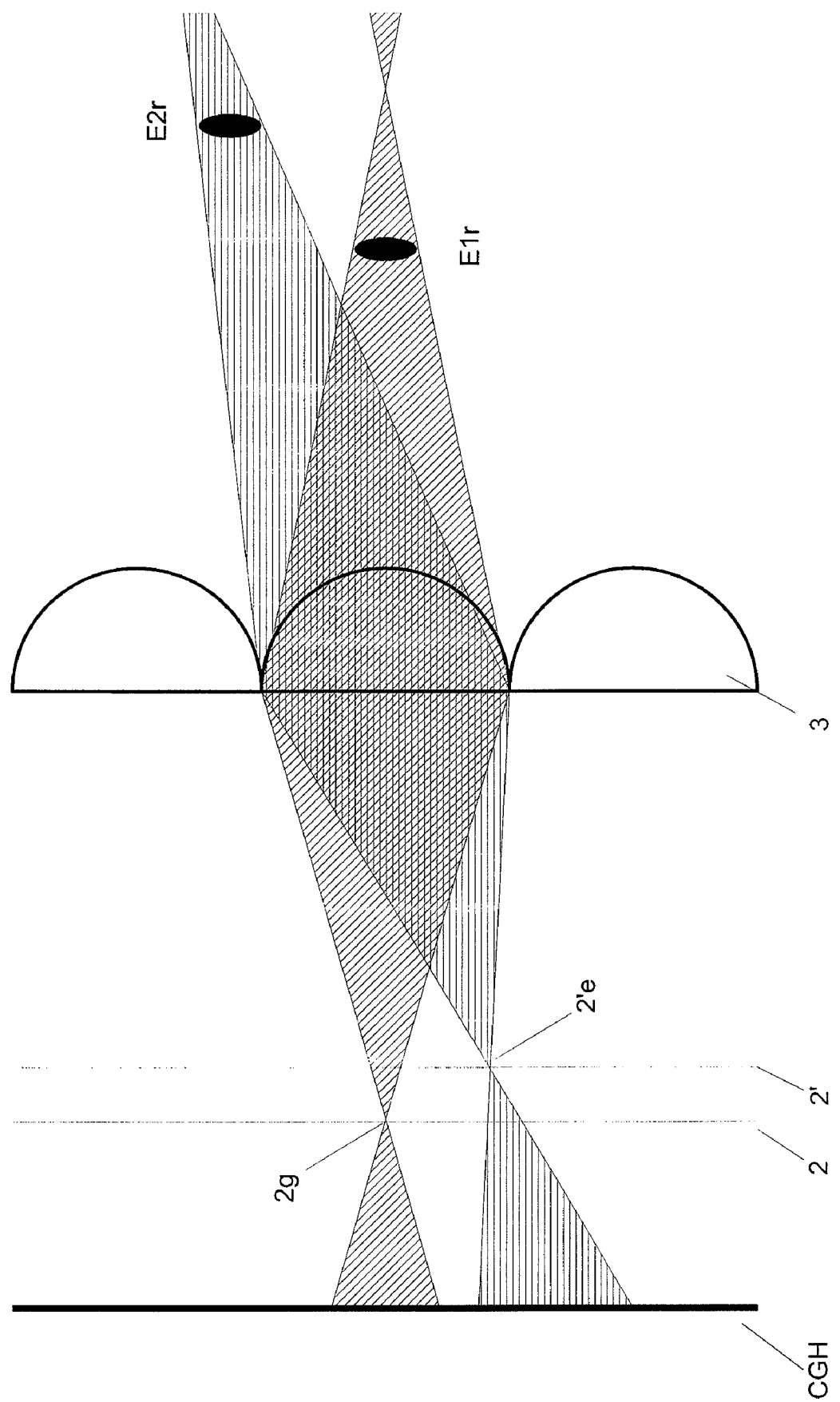
FIG. 5 shows secondary light sources as reconstructed by the CGH for two viewers situated in different viewing planes.

FIG. 5 shows schematically a detail of the CGH and the matrices 2 and 2' of secondary light sources reconstructed by it, containing the light sources 2g and 2'e. These two matrices are followed by the lenticular 3 and the right eyes Er1 and Er2 of two viewers who are situated in different viewing planes.

Now, the working principle of the controllable illumination device will be described in detail. The Figures always show only parts of the individual components, i.e. partial holograms etc. However, the description below always refers to the entire elements, i.e. holograms etc.

Referring to FIG. 1, a matrix of primary light sources 1 illuminates a CGH comprised in a SLM. Said matrix consists of light sources 11, . . . , 1n, and each light source is realised by one or more light-emitting elements. These elements may be point shaped light sources, line shaped light sources or area shaped light sources. The matrix of primary light sources 1 is controllable such that the light distribution impinging on the CGH can be varied. Thereby, not all primary light sources 11, . . . , 1n need to be activated. However, the CGH can alternatively be illuminated by the entire matrix of primary light sources 1. In the context of this illumination it is assumed that the light emitted by the primary light sources 1 used to reconstruct the CGH is spatially and temporally sufficiently coherent.

The SLM used for encoding the CGH is typically a controllable diffractive optical element (DOE), which may work in transmission or reflection. It preferably consists of a matrix of cells which affect the phase and/or amplitude of light impingent on these cells. These cells may be liquid crystal cells or micro-mechanical mirrors. Alternatively, continuously variable SLM, such as acousto-optically addressable spatial light modulators (AOSLM) may be used for hologram encoding. Generally known methods are used in order to make the DOE represent the complex amplitude values of the CGH. Because it is aimed to achieve maximum brightness at minimum use of illumination means, the DOE is used such that preferably only or almost only the phase of the light is affected. So-called phase holograms can thus preferably be represented. It is further possible to combine phase-modulating and amplitude-modulating elements. For example, an amplitude-modulating DOE can be combined with a phase mask which assigns different phases to adjacent DOE cells.

The CGH reconstructs a matrix 2 of secondary light sources using the light emitted by the matrix 1 of primary light sources. This matrix 2 of secondary light sources exhibits the desired secondary light distribution required for illuminating the transmissive reproduction matrix 4 of an autostereoscopic or holographic display (see FIG. 3). A secondary light source contains of one or more light-emitting elements, which may have to form of point shaped light sources, line shaped light sources or area shaped light sources. They are chosen such to suit the reproduction matrix 4. For example, line shaped light sources are preferred in autostereoscopic displays which use a lenticular as an imaging matrix. In order to achieve a homogeneous light distribution for the viewer, the CGH reconstructs for example a multitude of parallel line shaped light sources located next to each other. Autostereoscopic displays with such an imaging matrix only show a horizontal parallax. In contrast, a matrix of secondary point shaped light sources is required for an autostereoscopic display which exhibits a horizontal and vertical parallax.

If the autostereoscopic display is used as a multi-user display, not all secondary light sources 21, . . . , 2n are reconstructed in the same plane. As shown in FIG. 5, the secondary light sources 2g and 2'e (which are selected exemplarily here) are reconstructed by the CGH in two different planes, and their bundles of rays are simultaneously directed through a lenticule of the lenticular 3 and on to the eyes E1r and Er2 of two viewers which are situated in different viewing planes. The fact that the secondary light sources 2g and 2'e can be reconstructed in different planes makes it possible to vary the lateral extension of a bundle of rays. The lateral extension of a bundle of rays in the viewing plane is thereby defined by both the focal length of the lenticular 3 and the distances between the secondary light source and lenticular and between the lenticular and the eye plane respectivly. It may thus become necessary to adjust the extension of the bundles of rays in the viewing plane in order to track the bundles of rays according to an axial movement of the viewer, i.e. a movement away from or towards the display. If there are a multitude of viewers which are situated at different distances to the reproduction matrix 4 (not shown), as in the discussed example, a three-dimensional matrix of secondary light sources is created through the simultaneous reconstruction of secondary light sources for each viewer. In this way, a controlled three-dimensional illumination is realised. The eyes of the viewers receive as much light as necessary and cross talk of image information is prevented.

Depending on the number and position of the viewers and system parameters, such as the focal length of the lenticular used and the distances between the individual optical components of the system, the CGH is calculated and generates in a subsequent plane a matrix of secondary light sources 2. A changed CGH will be encoded in the SLM if the bundles of rays are to be tracked to the viewer(s). As shown in FIG. 2, another tracking option is to displace at least one primary light source 1h to position 1i, whereby the secondary light source 2h being reconstructed. In other words, the primary light source 1i is activated and the light emitted by 1i is modulated by the CGH so to reconstruct the secondary light source 2i. It is further possible to combine these two techniques.

The distance and shape of secondary light sources 21, ..., 2n are defined by the actually calculated hologram and the shape of the primary light sources 11, ..., 1n. By recalculating the hologram, the secondary light sources 21, ..., 2n can be displaces in their entirety as the matrix or individually, the distances between the individual secondary light sources 21, ..., 2n can be modified, and their number can be changed. A displacement of the entire matrix 2 of secondary light sources can alternatively be achieved by displacing the matrix 1 of primary light sources while leaving the CGH unchanged. Practically, the bundles of rays are re-oriented from one eye to the other through this displacement.

When calculating the CGH attention should be paid to the fact that a sufficiently large region around the position of the left or right eye of the viewer is illuminated and that the viewer sees the reproduction matrix with homogeneous brightness. Based on this requirement, the position and intensity distribution of the secondary light sources 21, ..., 2n as well as corrective measures, e.g. for the compensation of aberrations, must be considered when calculating the hologram.

By displacing the secondary light sources in axial direction, it is possible to correct the field curvature of the lenticules of the lenticular 4. The field curvature takes effect if a bundle of rays impinges on a lenticule or lens at an angle to its optical axis. To correct this optical aberration, the reconstruction of a corresponding secondary light source can be axially displaced accordingly. This is performed by suitably changing the hologram depending on the angle of incidence of the bundle of rays with respect to the optical axis. In addition, the aperture angle of the bundles of rays which generate the secondary light sources 21, ..., 2n may be varied depending on the viewing position.

Other embodiments of the illumination device are defined by additional optical elements for pre- and post-processing the primary and secondary light distribution, which are disposed in the planes in front of or behind the CGH. These elements can be refractive of diffractive, or act as apertures. For example, lenses may be disposed between the matrix 1 of primary light sources and the CGH in order to illuminate the hologram more efficiently.

Already in the matrix 1 of primary light sources itself, the light sources may be shaped with the help of prefabricated DOE, for example to form line light sources. Further, elements which redirect the bundles of rays may be disposed between the hologram 2 and the matrix 3 of secondary light sources, such redirecting elements transforming divergent bundles of rays into collimated or converging bundles of rays.

Furthermore, apertures may be disposed between the CGH and the matrix 2 of secondary light sources, said apertures eliminating residual non-diffracted light or undesired higher diffraction orders. These apertures must be adjusted to the matrix of secondary light sources, if the position and/or distance between individual light sources changes. Configurable apertures are therefore preferably used for this, e.g. in the form of a transmissive LCD panel where the individual cells exhibit variable transmittance. The configurable apertures may also be used to limit the extension of the secondary light sources 2 if required.

According to another embodiment of the controllable illumination device, the SLM can be a reflective SLM which is illuminated by an accordingly changed arrangement of primary light sources 1.

If the matrix 2 of secondary light sources is used for illuminating a holographically encoded reproduction matrix 4 in a holographic display, attention must be paid to the necessary spatial and temporal coherence of the secondary light sources.

When realising in practice the controllable illumination device in conjunction with an autostereoscopic or holographic display, in view of the multitude of positions of viewers' eyes for which a corresponding secondary light distribution is to be reconstructed, the individual CGHs are preferably pre-calculated and stored in a look-up table LUT.

The invention claimed is:

1. Controllable illumination device comprising an illumination matrix of primary light sources with at least one light-emitting element per light source and a controllable light modulator, the light of which penetrates a reproduction matrix comprising image information and is directed in bundles from an imaging matrix onto each eye of a viewer in a viewing plane, the imaging matrix comprising at least one imaging element; and a computer-generated hologram being encoded in the controllable light modulator and illuminated by primary light sources, whereby
the encoding is performed using variable parameters in order to realize an illumination configurable depending on the position of the viewer's eyes, and in at least one plane following the controllable light modulator a matrix of secondary light sources with a secondary light distribution is reconstructed by the computer-generated hologram.

2. Controllable illumination device according to claim 1, wherein the reproduction matrix is a stereoscopic or holographic display.

3. Controllable illumination device according to claim 1, wherein the secondary light sources form a matrix which optionally comprises point shaped light elements, line shaped light elements or area shaped light elements with a secondary light distribution.

4. Controllable illumination device according to claim 1, wherein the secondary light distribution is modified by changing the matrix of primary light sources and/or by changing the encoding of the computer-generated hologram.

5. Controllable illumination device according to claim 1, wherein the secondary light distribution is variable as regards the number of secondary light sources and the distances among the individual secondary light sources.

6. Controllable illumination device according to claim 1, wherein the secondary light sources can be moved in lateral, but also in axial direction.

7. Controllable illumination device according to claim 1, wherein the controllable light modulator for hologram encoding is a transmissive or a reflective element.

8. Controllable illumination device according to claim 1, wherein the controllable light modulator is preceded or followed by further optical elements for shaping, deflecting or eliminating bundles of rays, whereby an additional optical element can be a phase mask when a amplitude-modulating CGH is used.

9. Controllable illumination device according to claim 1, wherein the controllable light modulator with encoded computer-generated hologram (CGH) is followed by another transmissive controllable light modulator with variable openings to eliminate diffused light and light of higher diffraction orders, and to limit the extension of the secondary light sources.

10. Controllable illumination device according to claim 1, wherein the secondary light distributions corresponding with a multitude of viewers' eye positions and the individual computer-generated holograms (CGH) are pre-calculated and stored in a look-up table.

11. Controllable illumination device according to claim 2 with a holographic display as the reproduction matrix, wherein the primary and secondary light sources used to reconstruct the hologram of the reproduction matrix exhibit sufficient spatial and temporal coherence.

* * * * *